US008539079B2

(12) United States Patent
Thireault

(10) Patent No.: US 8,539,079 B2
(45) Date of Patent: *Sep. 17, 2013

(54) EDGE-BASED RESOURCE SPIN-UP FOR CLOUD COMPUTING

(75) Inventor: Jason Thireault, Chandler, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/572,505

(22) Filed: Aug. 10, 2012

(65) Prior Publication Data

US 2013/0080626 A1    Mar. 28, 2013

Related U.S. Application Data

(63) Continuation of application No. 13/245,601, filed on Sep. 26, 2011, now Pat. No. 8,244,874.

(51) Int. Cl.
*G06F 15/173*  (2006.01)
*G06F 15/16*   (2006.01)

(52) U.S. Cl.
USPC .......................... 709/226; 709/203; 709/219

(58) Field of Classification Search
USPC ................... 709/203, 217–219, 223–226
See application file for complete search history.

(56) References Cited

U.S. PATENT DOCUMENTS

| | | | |
|---|---|---|---|
| 4,466,063 A | 8/1984 | Segarra et al. |
| 5,995,756 A | 11/1999 | Herrmann |
| 5,996,022 A | 11/1999 | Krueger et al. |
| 5,999,525 A | 12/1999 | Krishnaswamy et al. |
| 6,052,737 A | 4/2000 | Bitton et al. |
| 6,094,677 A | 7/2000 | Capek et al. |
| 6,119,165 A | 9/2000 | Li et al. |
| 6,141,681 A | 10/2000 | Kyle |
| 6,163,859 A | 12/2000 | Lee et al. |
| 6,195,696 B1 | 2/2001 | Baber et al. |
| 6,310,889 B1 | 10/2001 | Parsons et al. |
| 6,347,398 B1 | 2/2002 | Parthasarathy et al. |
| 6,370,588 B2 | 4/2002 | Gebauer |
| 6,400,958 B1 | 6/2002 | Isomursu et al. |
| 6,421,726 B1 | 7/2002 | Kenner et al. |
| 6,546,554 B1 | 4/2003 | Schmidt et al. |
| 6,563,517 B1 | 5/2003 | Bhagwat et al. |

(Continued)

FOREIGN PATENT DOCUMENTS

| | | |
|---|---|---|
| EP | 1309153 A1 | 5/2003 |
| KR | 2003-0055645 A | 7/2003 |

(Continued)

OTHER PUBLICATIONS

Elizondo, J., et al. "Edge-Based Cloud Computing as a Feasible Network Paradigm," Department of Computer Science University of Texas at Austin, Dec. 4, 2009, 8 pages.

(Continued)

*Primary Examiner* — Bharat N Barot
(74) *Attorney, Agent, or Firm* — Kilpatrick Townsend & Stockton LLP

(57) ABSTRACT

Aspects of the present invention include distributing new resources closer to end-users which are making increased demands by spinning-up additional virtualized instances (as part of a cloud provisioning) within servers that are physically near to the network equipment (i.e., web servers, switches, routers, load balancers) that are receiving the requests.

20 Claims, 15 Drawing Sheets

(56) References Cited

U.S. PATENT DOCUMENTS

| | | | |
|---|---|---|---|
| 6,635,089 B1 | 10/2003 | Burkett et al. | |
| 6,637,020 B1 | 10/2003 | Hammond | |
| 6,640,238 B1 | 10/2003 | Bowman-Amuah | |
| 6,687,737 B2 | 2/2004 | Landsman et al. | |
| 6,708,166 B1 | 3/2004 | Dysart et al. | |
| 6,742,015 B1 | 5/2004 | Bowman-Amuah | |
| 6,832,241 B2 | 12/2004 | Tracton et al. | |
| 6,891,802 B1 | 5/2005 | Hubbard | |
| 6,917,937 B1 | 7/2005 | Rubendall | |
| 6,934,740 B1 | 8/2005 | Lawande et al. | |
| 6,947,063 B1 | 9/2005 | Cirulli et al. | |
| 6,952,714 B2 | 10/2005 | Peart | |
| 6,981,212 B1 | 12/2005 | Claussen et al. | |
| 7,000,013 B2 | 2/2006 | Mei et al. | |
| 7,065,707 B2 | 6/2006 | Chen et al. | |
| 7,203,901 B2 | 4/2007 | Chen et al. | |
| 7,308,649 B2 | 12/2007 | Ehrich et al. | |
| 7,356,575 B1 | 4/2008 | Shapiro | |
| 7,433,935 B1 | 10/2008 | Obert | |
| 7,505,936 B2 | 3/2009 | Huffman et al. | |
| 7,636,768 B2 | 12/2009 | Yang et al. | |
| 8,074,229 B2 | 12/2011 | Brunswig et al. | |
| 8,266,204 B2 * | 9/2012 | Bansal et al. | 709/203 |
| 8,321,521 B1 * | 11/2012 | Raciborski et al. | 709/213 |
| 8,356,074 B1 * | 1/2013 | Ehrlich et al. | 709/203 |
| 2001/0029525 A1 | 10/2001 | Lahr | |
| 2001/0037389 A1 | 11/2001 | Fujimori et al. | |
| 2001/0047428 A1 | 11/2001 | Hunter | |
| 2001/0056444 A1 | 12/2001 | Ide et al. | |
| 2002/0056010 A1 | 5/2002 | Lincoln et al. | |
| 2002/0091848 A1 | 7/2002 | Agresta et al. | |
| 2002/0099798 A1 | 7/2002 | Fedorovsky et al. | |
| 2002/0099829 A1 | 7/2002 | Richards et al. | |
| 2002/0116518 A1 | 8/2002 | Silen et al. | |
| 2002/0138588 A1 | 9/2002 | Leeds | |
| 2003/0014630 A1 | 1/2003 | Spencer et al. | |
| 2003/0018950 A1 | 1/2003 | Sparks et al. | |
| 2003/0084425 A1 | 5/2003 | Glaser | |
| 2003/0101434 A1 | 5/2003 | Szyperski | |
| 2003/0110234 A1 | 6/2003 | Egli et al. | |
| 2003/0167334 A1 | 9/2003 | Butler | |
| 2003/0177477 A1 | 9/2003 | Fuchs | |
| 2003/0225836 A1 | 12/2003 | Lee et al. | |
| 2004/0019497 A1 | 1/2004 | Volk et al. | |
| 2004/0073596 A1 | 4/2004 | Kloninger et al. | |
| 2004/0093396 A1 | 5/2004 | Akune | |
| 2004/0205172 A1 | 10/2004 | Kim | |
| 2004/0236795 A1 | 11/2004 | Johnston | |
| 2004/0267912 A1 | 12/2004 | Kim | |
| 2005/0044527 A1 | 2/2005 | Recinto | |
| 2005/0049886 A1 | 3/2005 | Grannan et al. | |
| 2005/0071806 A1 | 3/2005 | Sreedhar | |
| 2005/0073964 A1 | 4/2005 | Schmidt et al. | |
| 2005/0119977 A1 | 6/2005 | Raciborski | |
| 2005/0131971 A1 | 6/2005 | James et al. | |
| 2005/0289535 A1 | 12/2005 | Murray et al. | |
| 2006/0036570 A1 | 2/2006 | Schaefer et al. | |
| 2006/0055963 A1 | 3/2006 | Otsuka et al. | |
| 2006/0143247 A1 | 6/2006 | Poole et al. | |
| 2006/0174190 A1 | 8/2006 | Gomes et al. | |
| 2006/0212843 A1 | 9/2006 | Zaky et al. | |
| 2007/0113225 A1 | 5/2007 | Felts | |
| 2007/0118667 A1 | 5/2007 | McCarthy et al. | |
| 2008/0072264 A1 | 3/2008 | Crayford | |
| 2008/0091792 A1 | 4/2008 | Mei et al. | |
| 2008/0091808 A1 | 4/2008 | Mei et al. | |
| 2009/0013063 A1 | 1/2009 | Soman | |
| 2009/0049502 A1 | 2/2009 | Levien et al. | |
| 2009/0106447 A1 | 4/2009 | Lection | |
| 2009/0298478 A1 | 12/2009 | Tyhurst et al. | |
| 2010/0223364 A1 * | 9/2010 | Wei | 709/220 |
| 2010/0229108 A1 * | 9/2010 | Gerson et al. | 715/757 |
| 2011/0078333 A1 | 3/2011 | Jakubowski | |
| 2011/0099233 A1 * | 4/2011 | Calder et al. | 709/206 |
| 2011/0145413 A1 | 6/2011 | Dawson et al. | |
| 2011/0153656 A1 | 6/2011 | Sundstrom et al. | |
| 2011/0225231 A1 * | 9/2011 | Bansal et al. | 709/203 |
| 2011/0265164 A1 | 10/2011 | Lucovsky et al. | |
| 2012/0069131 A1 * | 3/2012 | Abelow | 709/217 |
| 2012/0110186 A1 * | 5/2012 | Kapur et al. | 709/226 |
| 2012/0147894 A1 * | 6/2012 | Mulligan et al. | 370/395.53 |
| 2012/0190458 A1 * | 7/2012 | Gerson et al. | 463/42 |
| 2012/0209901 A1 * | 8/2012 | Xu et al. | 709/201 |
| 2012/0226222 A1 * | 9/2012 | Calder et al. | 709/223 |
| 2012/0226799 A1 * | 9/2012 | Kapur et al. | 709/224 |
| 2012/0239792 A1 * | 9/2012 | Banerjee et al. | 709/223 |
| 2012/0311159 A1 * | 12/2012 | Bansal et al. | 709/226 |
| 2013/0110984 A1 * | 5/2013 | Raciborski et al. | 709/219 |

FOREIGN PATENT DOCUMENTS

| | | |
|---|---|---|
| KR | 2003-0094163 A | 12/2003 |
| KR | 2006-0064503 A | 6/2006 |
| WO | 2009/101414 A2 | 8/2009 |

OTHER PUBLICATIONS

International Search Report and Written Opinion dated Nov. 24, 2011 for International PCT Application No. PCT/US2011/031552, 9 pages.

Open Mobile Alliance, "Generic Content Download Over the Air Specification, Version 1.0," (Announcement Open Mobile Alliance), XP002264099, Proposed Version, Jun. 20, 2002, pp. 1-40.

* cited by examiner

--Prior Art --

EDGE-BASED RESOURCE SPIN-UP FOR CLOUD COMPUTING

RELATED APPLICATION

This application is a continuation of U.S. patent application Ser. No. 13/245,601, filed Sep. 26, 2011, entitled "EDGE-BASED RESOURCE SPIN-UP FOR CLOUD COMPUTING" which is related to U.S. patent application Ser. No. 13/245,582, filed Sep. 26, 2011, entitled "DYNAMIC ROUTE REQUESTS FOR MULTIPLE CLOUDS", which are incorporated by reference in their entirety for any and all purposes.

BACKGROUND

Presently, compute resources (i.e., applications, etc.) within a cloud provider's network are spun-up in a cluster (e.g., servers which are aggregated in a centralized location, a datacenter, etc.). All requests are load-balanced back to that cluster. Unfortunately, such an implementation does not necessarily provide the best performance or experience for end users who may, for example, be located far away from the centralized cluster.

This problem is further compounded by the fact that applications provided within the "cloud" are becoming more robust and require additional resources and computing power as well as faster response times. Accordingly, the computations being preformed over the web are becoming increasingly more intensive. As such, with the centralized cluster approach, many of these computations are being routed away from the user which adds to or even causes delays and an unacceptable user experience.

One example of a current implementation is illustrated by method 100 of FIG. 1. A data center 105 includes a compute platform 110 which is in communication with devices which produce user requests 115. As such, user requests 115 are received by the data center 105, which includes the cloud resources. As requests increase, software and services within the data center 105 are spun-up by additional cloud resources using the compute platform 110. The distance between the compute platform 110 and the user requests 115 may be great, and therefore, responsiveness and user experience are diminished greatly.

Furthermore, in the current cloud-service environments, customers must deploy their applications to a single cloud, and utilize the elasticity of the cloud to determine additional resources and spin those up accordingly within the cloud environment. Unfortunately, if the cloud provider is experiencing difficulties (either regionally or globally), the customer has no way to re-route requests to another cloud, and thus performance is dramatically impacted. Thus, for at least these reasons, improvements in the art are needed.

BRIEF SUMMARY

In one embodiment, aspects of the present invention distribute new resources closer to end-users which are requesting the resource. As such, additional virtualized instances (as part of a cloud provisioning) are spun-up within servers that are physically near to the network equipment (i.e., web servers, switches, routers, load balancers) which are receiving the requests. Accordingly, by moving computational resources closer to the requesting users in cloud computing environments, the user experience is significantly enhanced.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Further aspects of the present invention include dynamically routing requests for applications to one of multiple cloud computing environments. Alternatively, the method may dynamically route an application request to an application that is hosted in multiple clouds (deployed within a management application) based upon a specified criteria. In one embodiment, the routing of requests for the application to a specific cloud in which the application is deployed may be based upon a criteria(s) that the application owner specifies. This may provide the application owner an ability to positively affect quality of service (QoS) for application delivery, ensure uninterrupted access to the application in the event of failure by one or more clouds, and provide more efficient application performance.

In the figures, similar components and/or features may have the same reference label. In some cases, components of the same type are identified by following a first reference label with a dash and a second reference label that further distinguishes among the similar components. If only the first reference label is used, the description is applicable to any of the similar components designated by the first reference label.

DETAILED DESCRIPTION OF EMBODIMENTS

The ensuing description provides preferred exemplary embodiment(s) only, and such preferred exemplary embodiments are not intended to limit the scope or applicability of the present invention. Rather, the ensuing description will enable those who are skilled in the art to implement such preferred exemplary embodiment(s). Persons of skill in the art will recognize that various changes may be made in the function and arrangement of elements without departing from the spirit and scope of the invention as set forth in the appended claims.

Figure 1:
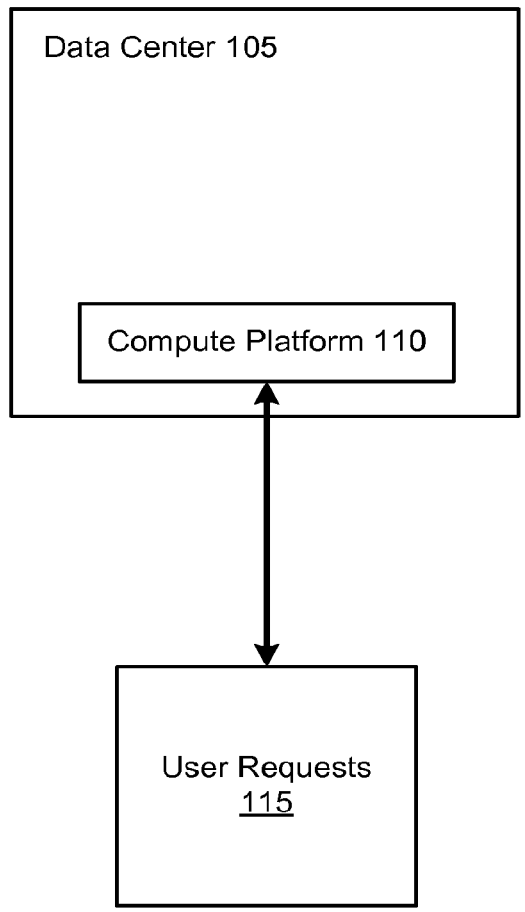
FIG. 1 shows a system for implementing cloud computing.
Figure 2:
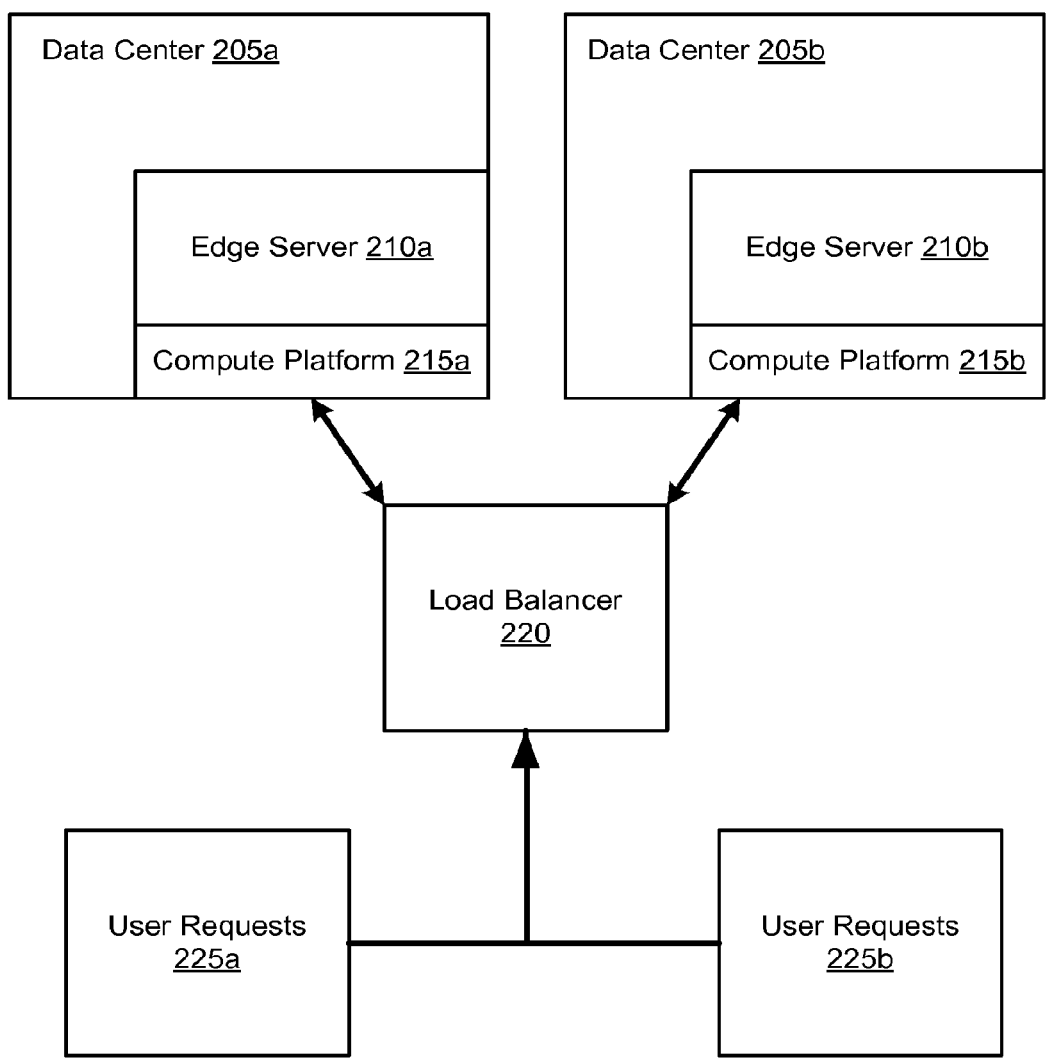
FIG. 2 shows a system for implementing edge-based resource spin-up for cloud computing.

FIG. 2 shows a system for implementing edge-based resource spin-up for cloud computing, in accordance with one embodiment of the present invention. In one embodiment, edge-based resource spin-up includes carrying out computational activities within a cloud computing environment closer to the end user. As such, an increase in responsiveness as well as a more efficient use of resources is realized. System 200 includes a data center 205a and 205b. In one embodiment, data centers 205 may be a facility used to house computer systems and associated components, such as telecommunications, networking systems, storage systems, etc. Furthermore, the data centers 205 may also be designated as points of presence (PoPs).

In one embodiment, the data centers 205*a* and 205*b* may include edge servers 210*a* and 210*b*, respectively. Further, edge servers 210*a* and 210*b* may include compute platforms 215*a* and 215*b*, respectively. It should be noted that one skilled in the art would conclude that any number of data centers, edge serves, and/or compute platforms may be included, and only two of each are shown for ease of explanation and illustration.

In a further embodiment, system 200 may include a load balancer 220 in communication with both data centers 205*a* and 205*b*, as well as user devices issuing user requests 225*a* and 225*b*. In a cloud computing environment such as the one depicted in system 200, many user requests may be received, and proper allocation and division of cloud resources should be allocated to handle the requests. Furthermore, many of the requests are time sensitive and latency sensitive (i.e., UI intensive applications, computation intensive applications, etc.), so ensuring fast response times to requests can be important. As such, in the confirmation of system 200, the load balancer 220 is configured to determine the "fastest" responding edge server/compute platform to direct the request. In one embodiment, fastest response time means the edge server closest physically to the requesting user device. Alternatively, fastest may mean the edge server with the lowest latency relative to the requesting device. In some instances, the closest and the lowest latency edge server may be the same server, but not always. For example, if the physically closest edge server is experiencing a heavy load of traffic and requests, the response time and/or network latency of the server may outweigh the physically close proximity to the requesting device.

In other words, the load balancer 220 is configured to ensure that the needed resources to respond to the user requests 225*a* and 225*b* are routed to the edge servers 210*a* and 201*b* which will provide the fastest response time for the request, which in many cases will be the edge server which is in the closest proximity to the requesting user device.

In one example, two groups of users make requests from two different geographical locations. The load balancer 220 then receives the requests and, based on the location of the request, distributes the request to the data center 205*a* or 205*b* closest to the user (alternatively, the request may be routed to the data center which will provide the faster response time). Once the request is routed, it is received by a "localized cloud instance" which is a de-centralized cloud computing environment with resources spun-up as physically close to the requesting device as possible. In one embodiment, such localized resources may be synchronized around the network to ensure that requests come to one localized cluster are treated in the same manner as other requests. Then, based on the request load that is delivered to that "localized cloud instance," resources are spun-up in that locality based upon demand (i.e., subsequent user requests).

Figure 3:
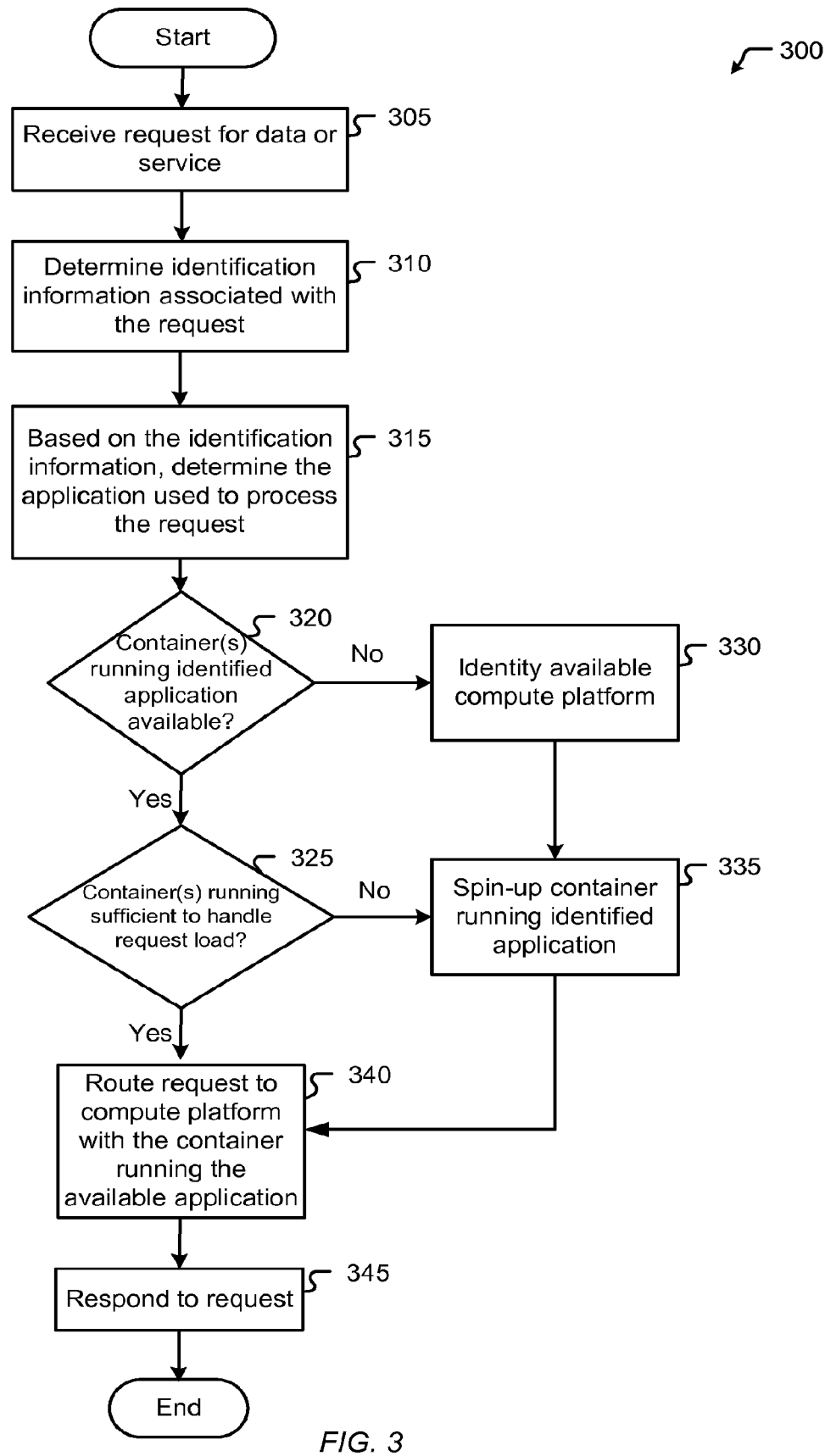
FIG. 3 shows a method of implementing edge-based resource spin-up for cloud computing.

FIG. 3 shows a method 300 of implementing edge-based resource spin-up for cloud computing, in accordance with one embodiment of the present invention. At process block 305, a request for data or a service may be received at an edge server from a user device. In one embodiment, the closest edge server to the requesting device may be determined by using an enhanced anycast methodology. Accordingly, the edge server which provides the fastest response time relative to the requesting user device is selected.

In one embodiment, the request may be for an application, such as an enterprise application, a media application, etc. Alternatively, the request may be for data, such a video file, a music file, a document, etc. Each request may have associated information sent with the request which identifies the application and/or data used to service the request. The identification information may be embedded or attached to the request.

Furthermore, at process block 310, the edge server may extract the identification information. Then, based on the information, the edge server can identify the application/service used to process the request (process block 315). For example, the identification information may specifically identify the application by name or some other identifier, or alternatively the information may include an application type, etc.

Further, the selected edge server may be in communication with one or more compute platforms, which may be co-located or remotely-located with the edge server. Additionally, each of the compute platforms may have one or more containers running which provide a virtual construct for allocating resources. In one embodiment, these containers may be a type of virtualized resource which is different from a virtualized instance, such as elastic computing cloud (EC2). The containers are then configured to execute and maintain applications needed to service the user requests. Hence, at decision block 320, a determination is made whether a container maintained by a compute platform in communication with the selected edge server is running (or capable of running) the application necessary for servicing the user request. In one embodiment, all of the edge-based compute platforms may include the "DNA" for running an application (e.g., an XML dataset that specifies instructions for each application to be run in a container), and the determination for being able to run the application based on the current levels of utilization. As such, the allocation of the compute platform becomes a predictive determination. In one embodiment, a compute platform is capable of running the application if the compute platform has sufficient unused resources, if the necessary application is loaded on the compute platform, etc.

If the application is not running on any of the containers within the compute platforms, then at process block 330, an available compute platform (or on other words, a compute platform which has available resources) is identified. Accordingly, it may not matter if the application is not currently running, as the application can be spun up; availability can be based on either a currently running application or the necessary capacity to support the application running, which could then be translated to actually spinning up a container, on demand, to support the requests. Then, one or more containers are spun-up by the identified compute platform to run the identified application or service (process block 335).

Alternatively, if there is a container identified as running the application, then a determination is made whether the container has sufficient resources to handle the increased load of the new request (decision block 325). If the container does not have sufficient resources to handle the increased load, then at process block 335, a container (or containers) may be spun-up to run the identified application. Alternatively, if the container has sufficient resources to handle the increased load, then at process block 340, the request is routed to the compute platform with the container already running the identified application. As such, the load is effectively balanced to the compute platform and container with available resources from the edge server with the closest physical proximity to the requesting device; thus, providing the most efficient user experience.

One example of an implementation of method 300 may be performed for the MediaTag™ application. In one embodiment, a user may click on a link/file that the user desires to purchase. The file includes an associated cookie which is used to point the request to the MediaTag application. The application makes a request of the cookie which has been stored on the user's machine by the website providing the music download; MediaTag then takes the cookie, explodes it, and carries out computational activity against the results. The edge server then upon receiving the request interprets the tag and identifies a compute platform which is capable of spinning-up resources for the MediaTag application. Alternatively, the determination may be based solely on geography—the closest POP with resources; there is sometimes a tradeoff between locality and capacity—as a system may chose to actually go to a more distant compute resource to carry out my request because the latency of serving the response is actually less than the latency caused in the local edge by the lack of capacity.

Then, the compute platform spins-up a container running the MediaTag application. The MediaTag application then creates a unique file based on the request (the file may include identification information, such as the username of the requester, the origination location, etc.). Again, alternatively, the choice may be based on both proximity and the current utilization level of that current proximal location; there is a tradeoff. Then, a response to the request is sent to the user (process block 345).

This entire process is implemented using the edge-based cloud computing solution of the present invention. At each step of the execution of the MediTag application, resources and servers are chosen based on their physical proximity to the requesting user device, thus increasing the efficiency and executing time of the MediaTag application. Other applications may be implemented in the same or similar way utilizing method 300.

Figure 4A:
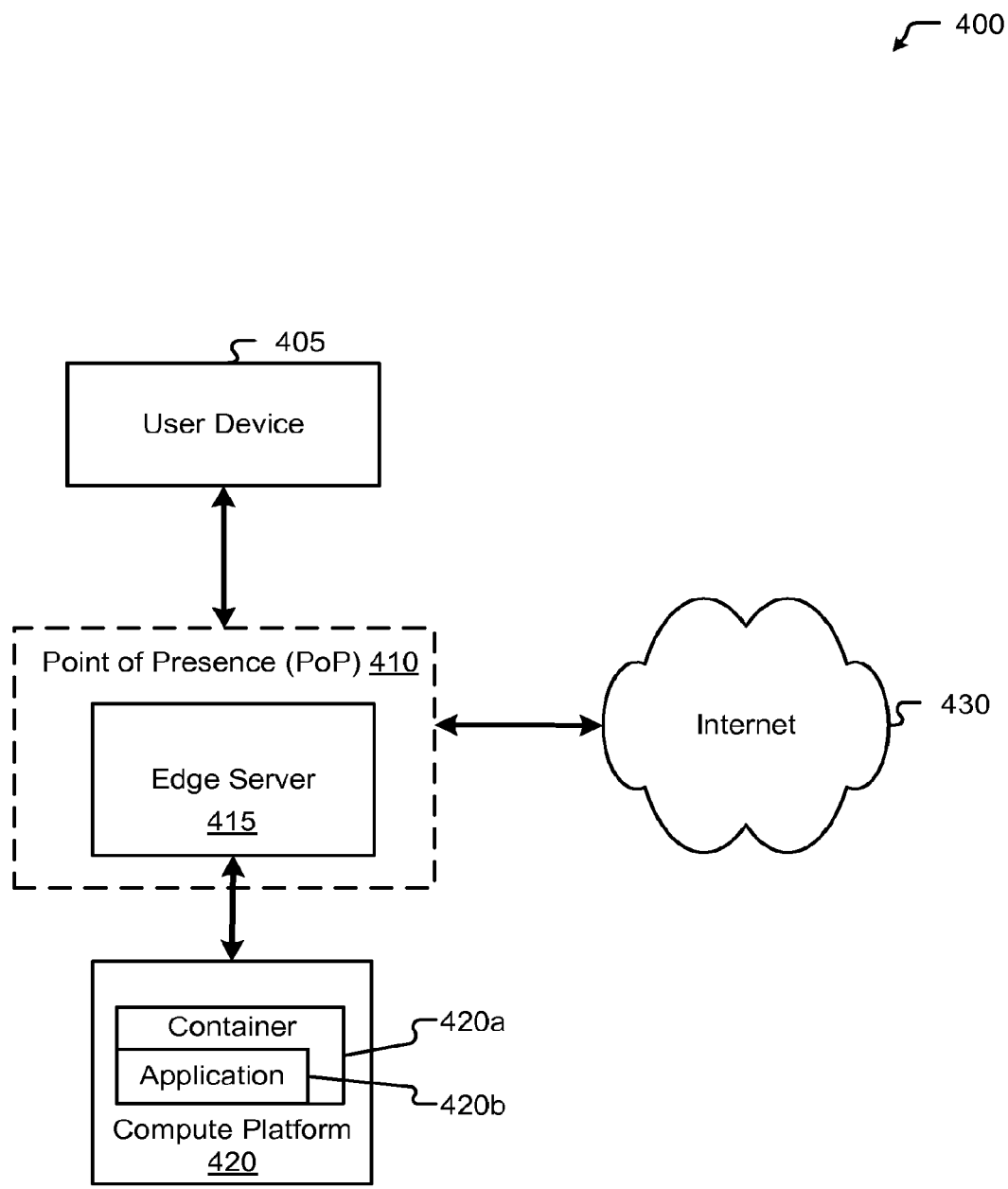
FIGS. 4A-4D show systems for implementing edge-based resource spin-up for cloud computing.

Referring next to FIG. 4A, a system 400 for implementing edge-based resource spin-up for cloud computing is shown, in accordance with embodiments of the present invention. The system 400 may include a user device 405. In one embodiment, the user device 405 may be a mobile device, a cellular device, a SmartPhone, a mobile computing platform, a user terminal, etc. The user device 405 may be configured to send requests and access data, services, and applications. Further, the user device 405 may be in communication with a cloud computing network as shown in system 400.

In one embodiment, the user device 405 may be in communication with a point of presence (PoP) 410. PoP 410 may be configured as an access point to the Internet 430, a physical location that houses servers, routers, ATM switches, digital/analog call aggregators, etc. Further, PoP 410 may be either part of the facilities of a telecommunications provider that the Internet service provider (ISP) rents or a location separate from the telecommunications provider. Generally, PoPs are also located at Internet exchange points and collocation centers.

An edge server 415 may be located within PoP 410. The edge server 415 may be operated by a cloud computing provider, or the like. The edge server 415 may represent one of the cloud computing provider's closest connection points to the Internet 430. As such, the edge server 415 is uniquely qualified to provide the fastest and most efficient service to the user device 405, particularly with regard to spinning-up resources for use in a cloud computing environment. In many implementations there may be hundreds of edge servers ready to receive and process user requests.

Accordingly, as requests are generated from user device 405 and routed to edge server 415 via PoP 410, the edge server 415, in communication with a compute platform 420, may direct the compute platform 420 to handle the requests.

For example, edge server 415 may direct compute platform 420 to spin-up a container 420a to handle the incoming request. In one embodiment, spinning-up container 420a includes allocating and assigning the necessary resources and applications to handle the request. For example, if the request is for application 420b, then an instance of application 420b (e.g., MediaTag, video player, gaming application, etc.) will be initiated in container 420a. Likewise, if it is determined that application 420b requires X amount of processing power, memory allocation, hard drive space, etc., then these needed resources will also be allocated in container 420a. As such, container 420a is spun-up such that container 420a is equipped to handle the request from user device 405.

In a further embodiment, the PoP 410 may be selected as being the "closest" PoP to the user device 405. In one embodiment, closest means the closest in physical proximity to the user device 405, which in turn provides the fastest response time to requests, thus enhancing the cloud computing experience. For example, in a central server cloud computing configuration, computations are routed away from the user device; however, in an edge-based cloud computing environment as in system 400, the computations are performed as close as possible to the user device 405. As such, rendering of cloud applications can be done without diminishing the experience (i.e., the application can be rendered as though the application is run "locally" on the user's device, or in a local area network or the like). This may be particularly important with regard to mobile users in that—as the user moves, so too may the "closest" available edge server "move".

Furthermore, such a cloud computing configuration as in system 400 can provide a more efficient use of resources. For example, instead of implementing a large expensive resource intensive centralized cloud computing platform, the de-centralized model allows for resources to be spun-up in order to handle specific user requests. Furthermore, system 400 (additionally, systems 401-403) provides a scalable solution, such that as additional requests are received by compute platform 420, the platform can direct additional containers to be spun-up to dynamically handle the increased load. In other words, the containers allow for dynamically creating instances of the systems' operating system which has been "tuned" for a specific purpose. Therefore, the necessary resources are provided in response to the received requests, and the resources are provided at the closest location to the requesting device.

Alternatively, other factors can be considered when determining the appropriate edge server to route the user device 405's request. For example, "effective latency" or "effective distance" may be considered. In one embodiment, effective latency or distance may be defined as the accrual speed of a response to a user device request. For example, edge server 415 may be physically closer to user device 405, but edge server 415 may be heavily congested. Thus, edge server X (which is physically further from user device 405) may have a better effective distance or latency, and may ultimately be selected to process the request, despite its distance from user device 405. Similarly, outages and other issues may be considered when determining which edge serve will actually (or effectively) provide the fastest response time and ultimately the most desirable user experience. Such a cloud computing environment uniquely provides what a centralized cloud computing environment is unable to provide: scalability, efficiency, and faster response times.

Additionally, configuration files (or the like) may be used to determine the edge server and/or the compute platform to handle certain user requests. For example, a certain edge server may be closest to the user device 405, but because the edge server does not have access to the requested application or other resource, a further edge server may need to be used. Therefore, the configuration file may provide such designation and mappings, such that requests are routed to edge servers and compute platforms that are actually equipped to handle the request. Additionally, the configuration files may also provide an accounting of the physical as well as the virtual resources available to each edge server, which can assist in routing decisions by not overloading edge servers above their resource capability capacity, etc.

An additional advantage of edge-based cloud computing may be that requests are able to be routed using URLs. URLs uniquely allow for information to be appended to the URL which can provide the necessary information to the edge server for more efficient routing and resource allocation. In addition, URL-based routing enables a variety of systems (e.g., anything capable of dealing with HTTP) the ability to forward the request along. This makes for a very flexible application architecture and a distributed computing environment in that individual application components, all making URL (i.e., HTTP-based) requests, can be completed from different compute resources, not necessarily all the same resource—the resources used for these requests can be fanned out.

Figure 4B:
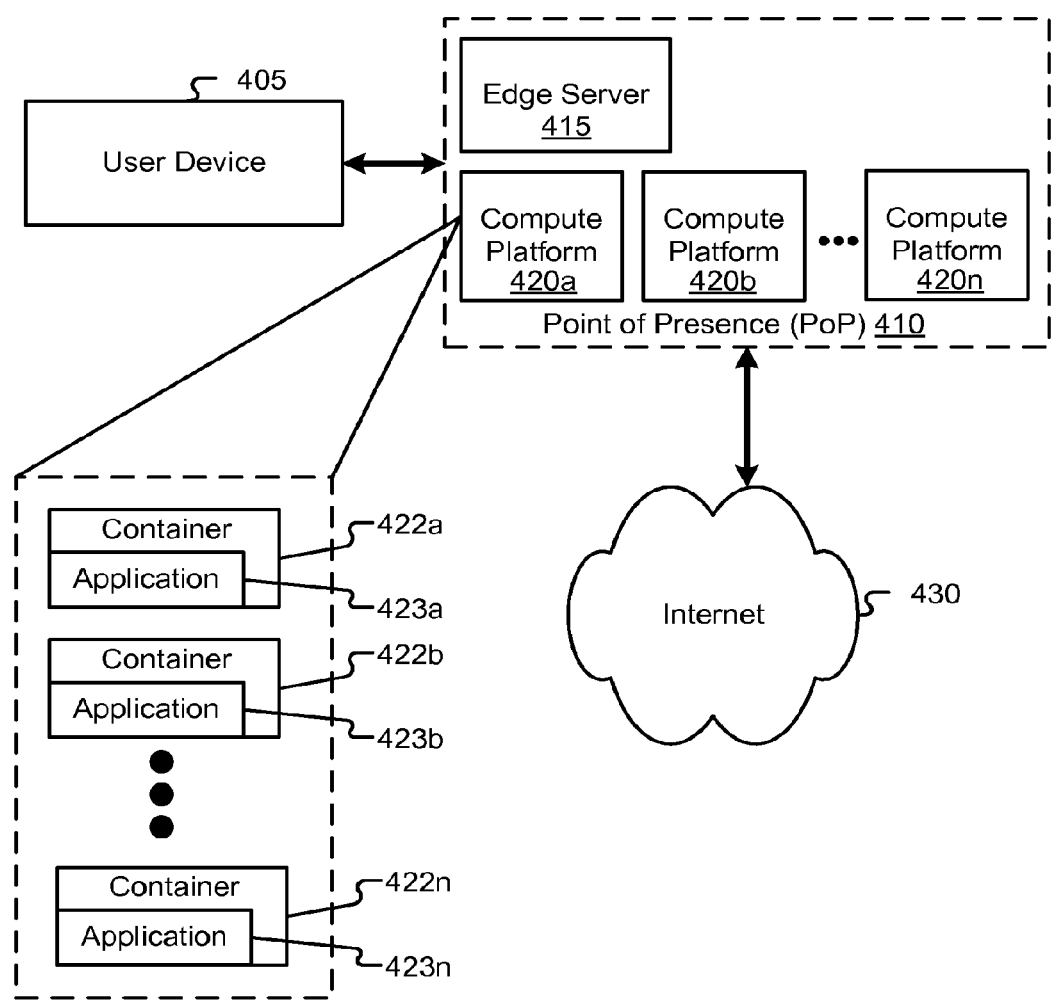

FIG. 4B shows an alternative embodiment of an edge-based cloud computing configuration. In one embodiment, system 401 may have the compute platform 420 co-located with edge server 415 at PoP 410. Furthermore, multiple compute platforms 420a, 420b to 420n may be provided. As such, the additional compute platforms may provide the edge server with access to additional resources in order to handle additional requests. Furthermore, since the compute platforms 420a to 420n are co-located with the edge server 415 at the PoP 410, latency can be significantly reduced. Accordingly, computations for user requests are pushed even closer to the user device 405 originating the request. Accordingly, the edge is "super-charged" with readily available compute resources to meet specific types of requests. In addition, new intelligence is added to the edge to better route request traffic (i.e., URLS) to other edge resources, different POPs, etc., depending upon performance and/or availability factors that reflect customer preferences.

In a further embodiment, each of the compute platforms 420a through 420n are capable of spinning-up multiple containers 422a through 422n. Thus, each of the containers 422a through 422n can also provide instances of applications 423a through 423n. Accordingly, each compute platform 420 can expand or shrink to effectively and efficiently accommodate an increase or decrease in user requests. The dynamic nature of resource allocation coupled with the relative closeness in proximity to the user device 405 provide for an optimal user experience in a cloud computing environment.

Figure 4C:
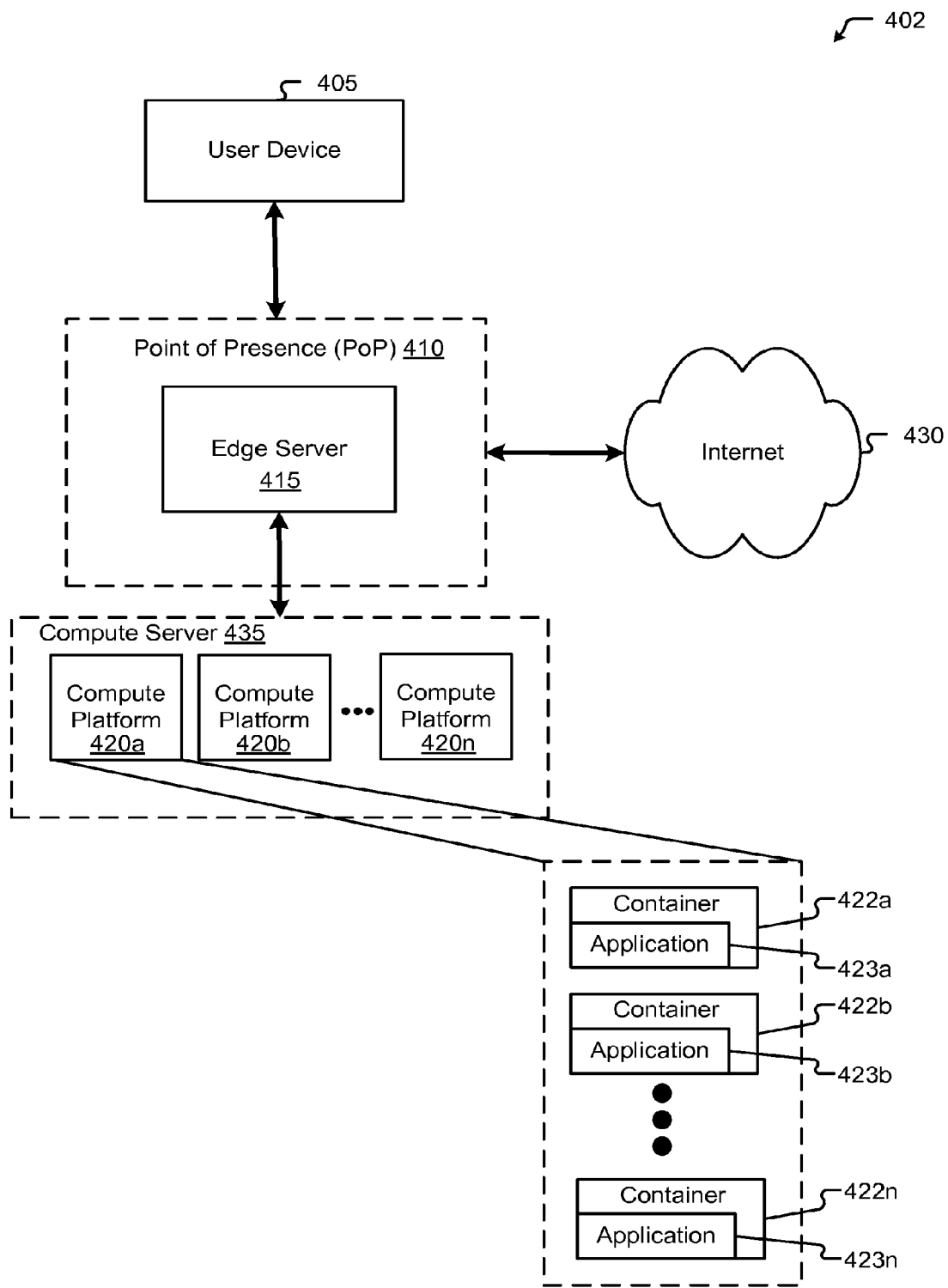

FIG. 4C shows another embodiment of an edge-based cloud computing environment. System 402 shows an alternative configuration in which the compute platforms 420a through 420n are located at a compute server 435, which may be remotely located from the edge server 415 and PoP 410. For example, since server space may be expensive within the PoP 410, it may be economical to place the compute platforms at a location in close proximity to the PoP 410 which is less expensive. As such, the diminished response time (which is minimal) may be outweighed by the reduced cost of non-PoP space (in particular, if the same edge resources are being utilized for other purposes (i.e., streaming)). Additionally, at the reduced cost of implementing compute server 435, the computational power at the edge server 415 can be significantly increased, and as such is able to handle an increased amount of requests; thus increasing the scalability and efficiency of the cloud computing environment.

Figure 4D:
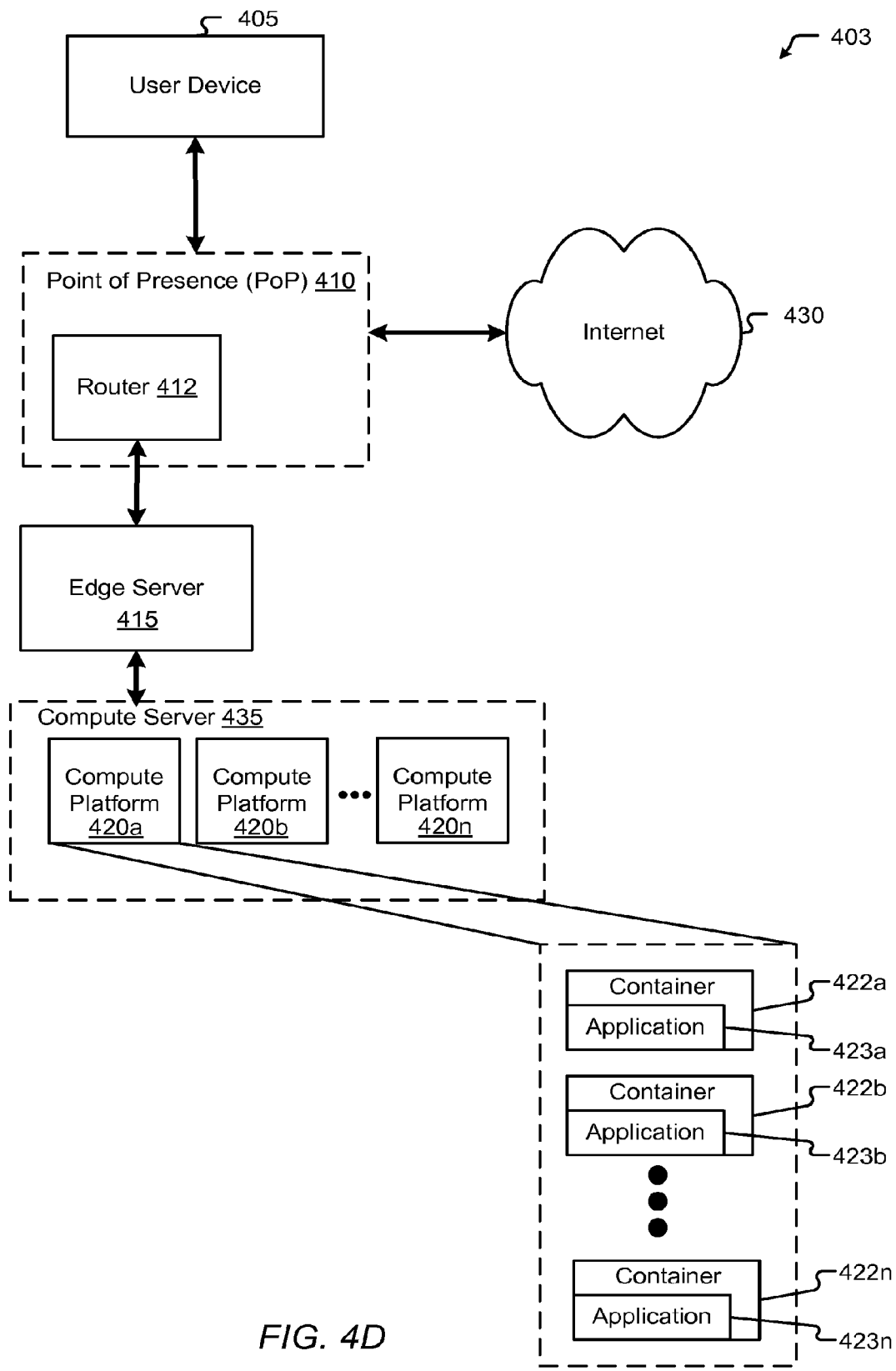

FIG. 4D shows a further embodiment of an edge-based cloud computing environment. In this embodiment, shown as system 403, instead of the edge server 415 being located at the PoP 410, a router (or the like) 412 is located at the PoP 410. The router 412 may be configured to route requests from the PoP 410 to the edge server 415. Then, the edge server 415 can direct the requests to the appropriate compute platform 420 within the compute server 435. In one embodiment, the compute server 435 may be co-located with edge server 415, or alternatively the compute server 435 may be remotely-located from the edge server 415.

Further aspects of this invention include dynamically routing requests for applications to one of multiple cloud computing environments. Alternatively, the method may dynamically route an application request to an application that is hosted in multiple clouds (deployed within a management application) based upon a specified criteria. In one embodiment, the routing of requests for the application to a specific cloud in which the application is deployed may be based upon a criteria(s) that the application owner specifies. This may provide the application owner an ability to positively affect quality of service (QoS) for application delivery, ensure uninterrupted access to the application in the event of failure by one or more clouds, and provide more efficient application performance.

As Web applications are becoming increasingly more complex and resource intensive, (in some cases requiring multiple coded elements, multiple data stores, external and internal system integration, etc.), even a few milliseconds of latency between the user requesting an element of the application (via, for example, a URL) and the response to the user, can cause a user to utilize a competitors' offering and thereby materially impact business for the Web application owner. In addition, there are a variety of factors that may impact (negatively or positively) the ability for a specific cloud to respond favorably (based on, for example, business rules) to a user request. This can include proximity of the cloud assets to the end user, peering relationships between the cloud service provider and ISPs on which users are accessing the cloud resources, etc. Thus, aspects of the present invention create a picture of that responsiveness to eventually enable a dynamic adjustment of business rules based on analysis of the data provided as part of the overall system.

One embodiment of the present invention may provide that a customer signs up for a "multi-cloud application deployment" which entails provisioning for a content delivery network (CDN) account (i.e., providing HTTP service or the like), as well as enabling the customer access to a portal (or other web-based UI) that allows the customer to specify the cloud-based locations of their applications, the URLs to those applications, the business rules the customer wants the applications to follow when shuttling requests to different clouds, etc. Each cloud that the customer specifies may require a unique hostname provided by the CDN.

Figure 5A:
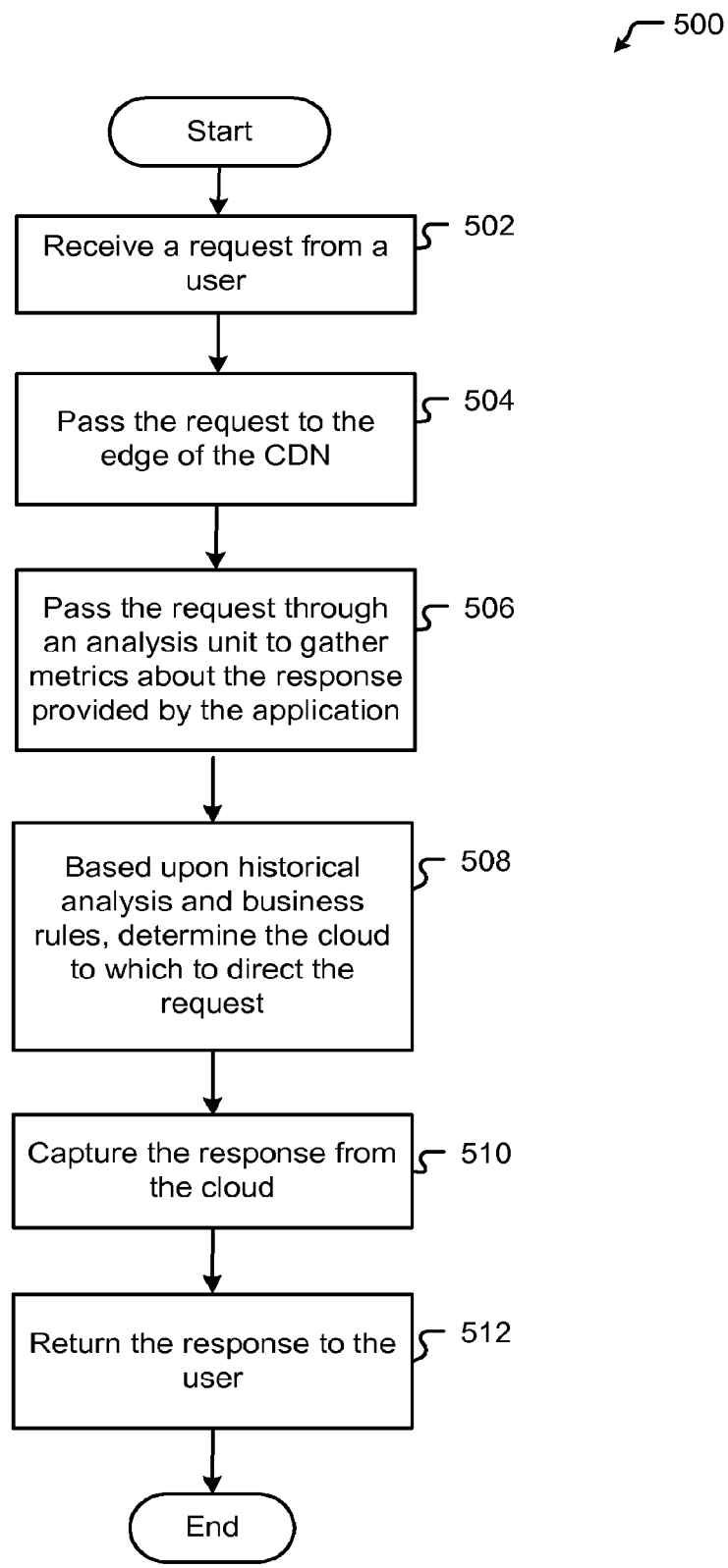
FIGS. 5A-5D show methods of implementing dynamic route requests for multiple clouds.

Turning now to FIG. 5A, which illustrates that once the multi-cloud application deployment has been properly configured, method 500 may be executed. At process block 502, a request may be received by the end user. This request may then be passed to the edge of the CDN via a CNAME or designated hostname provided by the CDN to the customer that configures their application URLs accordingly (process block 504). At process block 506, the request may then be passed through a request analysis unit (or similar module) to gather metrics on the response provided by the application to which the request is being used. For example, a historical picture of specific cloud responses may be generated and developed.

At process block 508, based upon historical analysis (explained below) and business rules, a cloud control unit (or similar module) may then determine the cloud to which to direct the request. At process block 510, the response from the cloud for the request is captured by a request analysis unit (or similar module) and the response is returned to the user (process block 512). As such, a historical picture of cloud responsiveness for the application is developed through the following two ways: 1) Actual data—the request analysis unit captures ongoing data about the responses from clouds to user requests and develops a histogram (or the like) to depict overall cloud responsiveness (which may be provided to the customer), or 2) Analytics—based upon the activities carried out in the actual data, the system develops an overall picture of cloud performance (by day, by time, by geographic request, etc.) using a systematic "pinging" of the cloud application over a period of time. Thus, the aggregation of these "pings" to the application may then be utilized to further shape the data picture of the overall responsiveness of a specific cloud.

Furthermore, aspects of the invention also provide customers with the ability to specify business rules that determine when and why a request should be routed to a specific cloud. These business rules may be dynamically adjusted within parameters (rather than, for example, hard and fast thresholds) based upon analysis provided by the data gathered from actual and analytics data.

Figure 5B:
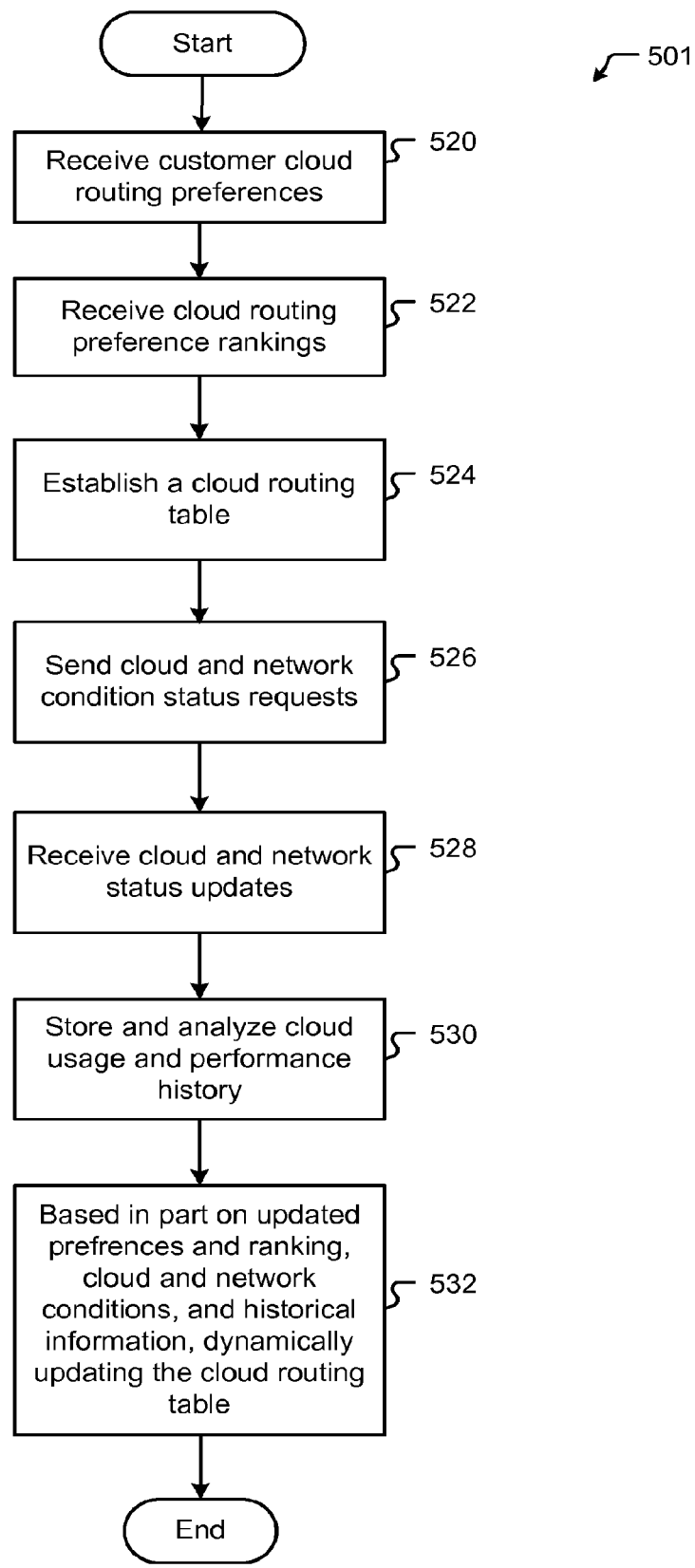

Referring next to FIG. 5B a method 501 is illustrated in accordance with embodiments of the present invention. At process block 520, customer cloud computing network routing preferences may be received. In one embodiment, the preferences may include cost, performance, applications provided, network conditions, outages, business relationships, peering relationships, proximity, etc. For example, the customer may prefer to optimize cloud usage to be most cost efficient as possible. As such, the least expensive cloud computing network may be selected for routing requests for this particular customer, even at the expense of performance. Similarly, if the customer places a high importance on performance, then cost may be secondary to providing the highest level of performance. At any rate, the determination of which of the cloud computing networks to route requests may be based in whole or in part on the customer's preferences.

An additional consideration may be driven by providing benefits to the network provider. For example, one or more cloud computing networks may be underutilized and so requests may be routed to the underutilized cloud computing networks in order to balance the load among the various clouds. Furthermore, certain clouds may provide services and applications and, as such, requests may be directed to the clouds which align with the requested service or application.

In addition to the preferences received from the customers, the customers may also be able to provide weighting and/or ranking for each of the preferences (process block 522). For example, the customer may have preferences set for cost, performance, and quality of service, and each of these categories may have a weight associated with it. In one embodiment, performance may be, for example, weighted at a first value while cost may be weighted at a second (lower) value. Accordingly, when analyzing which cloud to route requests, the weights of each preferences may guide and direct the decision making process.

Utilizing the preference information and weighting information in connection with performance data for each of the clouds, a cloud computing network routing table (or similar construction) may be generated (process block 524). Accordingly, in one embodiment, the routing table may be used to provide real-time routing changes and decisions for directing requests to the most optimal and favorable cloud computing networks. The routing table may be dynamically updated as preferences and weighting change and in response to changes in the network conditions and performance. The cloud and network conditions may be determined based in part on status requests (pinging, multicast, and the like) sent to each of the cloud computing networks (process block 526). As such, the status for each cloud computing network can be updated based on the response received form the status requests (process block 528).

At process block 530, in addition to the performance updates, historical data for each cloud may be tracked, analyzed, and stored. Additionally, performance data may also be stored. Such information may be used in conjunction with the real-time status update information, preferences, and rankings to dynamically update the cloud computing network routing table (process block 532). Therefore, intelligent decision-making with regard to where to route each individual cloud-based application or service request can be realized.

Figure 5C:
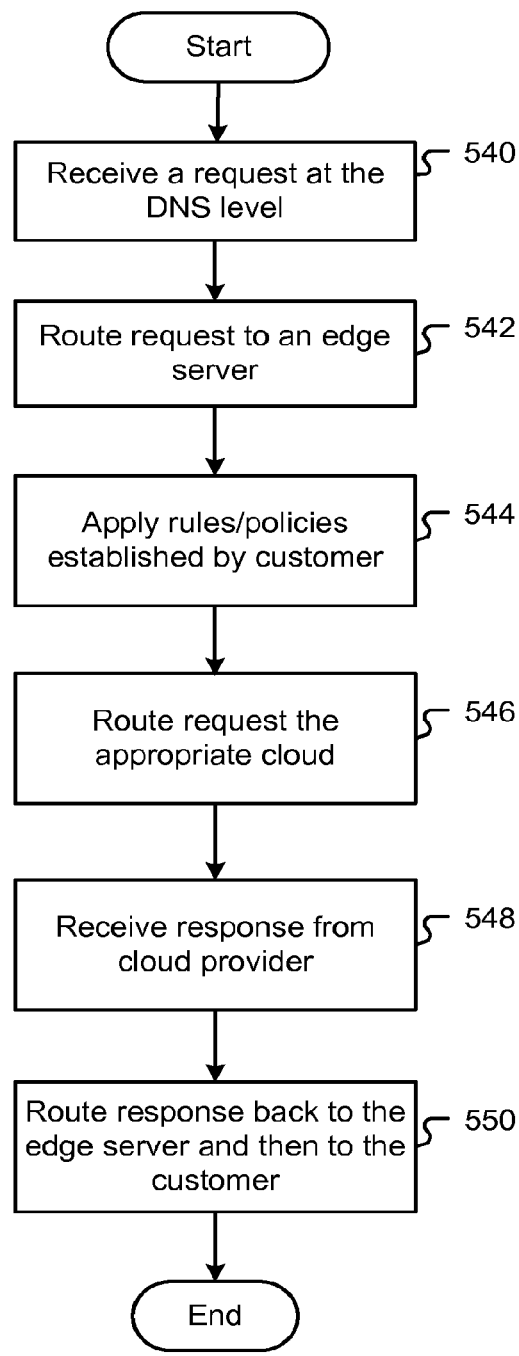

Referring now to FIG. 5C, a method 503 is illustrated in accordance with embodiments of the present invention. At process block 540, a request for cloud-based applications or service may be received at the DNS level. In response, the request may be routed to an edge server or the like (process block 542). At the edge server, the customer rules/policies may be applied to the incoming request (process block 544). As such, as discussed above, requests can be routed to a preferential cloud computing network. Accordingly, once an optimal cloud computing network is selected, the request is then routed to that cloud computing network (process block 546).

At process block 548, a response is received from the cloud computing network. In one embodiment, response time and other metrics may be collected and recorded for assisting in making future routing decisions. Then, the response may be routed back to the edge server and on to the requesting customer (process block 550).

Figure 5D:
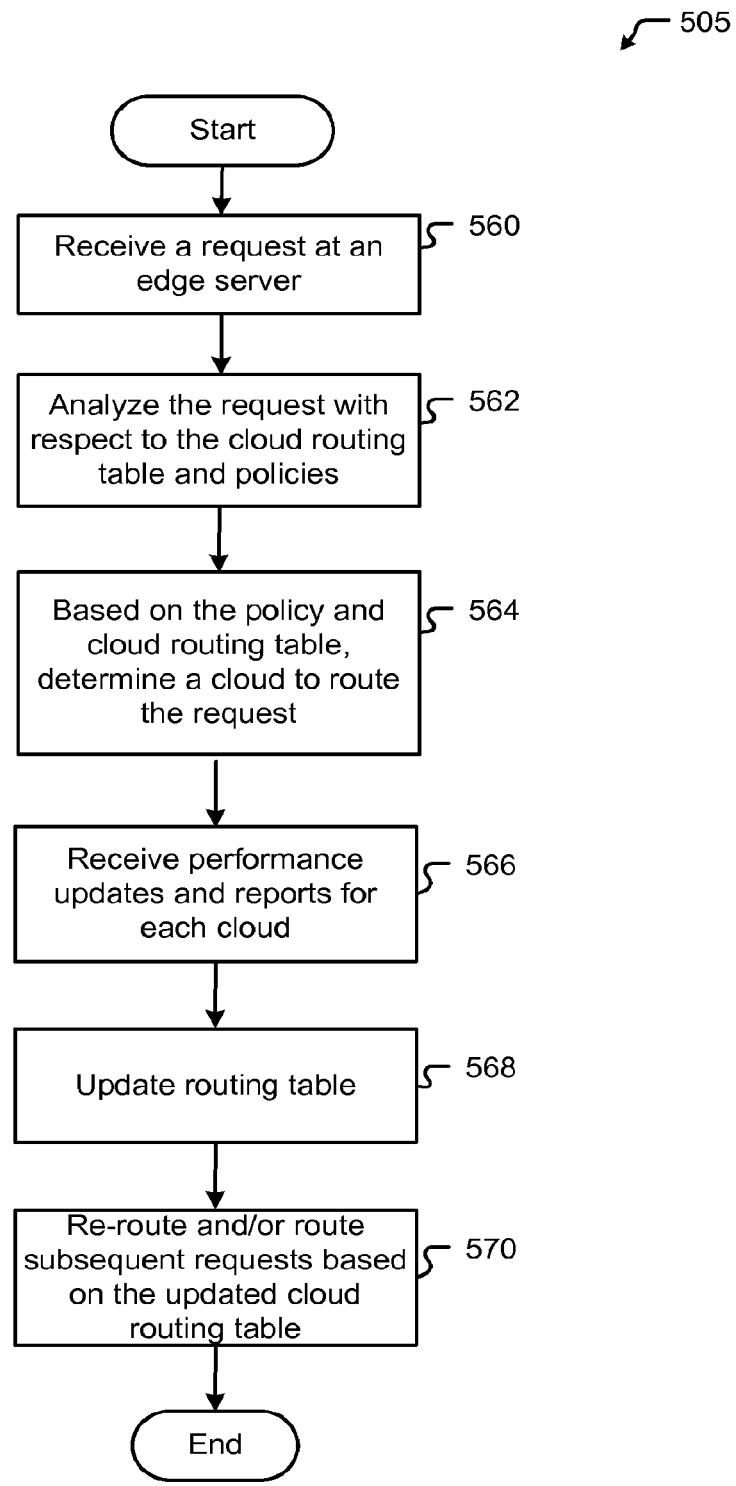

FIG. 5D illustrates a method 505 in accordance with embodiments of the present invention. At process block 560, a cloud-based application request may be received at the edge server. The request may be analyzed with respect to the cloud computing network routing table and the policies associated with the customer originating the request (process block 562). Accordingly, based on the policies and cloud routing table, a cloud is determined to route the request (process block 564).

At process block 566, performance update and reports may be received regarding the request as well as the status of each cloud. In one embodiment, this information may be used to provide a centralized (or single) view for status and performance of each of the cloud computing networks. Accordingly, such a user interface may provide a dynamic view of each cloud's performance, status, applications, and service providers, etc. Accordingly, an administrator may be able to utilize such information to make routing decisions in real-time in order to provide the most optimal cloud-based application and service experience.

Furthermore, based on the updated information for each of the cloud computing networks, the routing table may also be updated (process block 568). As such, as subsequent requests are received by the edge server, these requests may be routed/re-routed to various clouds to reflect the changes to performance, cost, etc. of the clouds (process block 570). For example, a cloud based in India may have a higher latency for customers in New York than a cloud based in Atlanta. However, because of congestion (or other link conditions) the Indian cloud may be able to out-perform the Atlanta cloud despite the latency issues. As such, the routing table would be changed to reflect the change, and requests would be routed accordingly. Similarly, as the Atlanta-based cloud congestion subsides, the routing table would be updated accordingly, and requests would then be routed back to the Atlanta-based cloud from the Indian-based cloud, and so forth. Essentially, the dynamic nature of the routing of requests to multiple cloud computing networks for vides customers with the ability to have requests dynamically routed in the most efficient way possible based on current conditions and preferences.

Figure 6A:
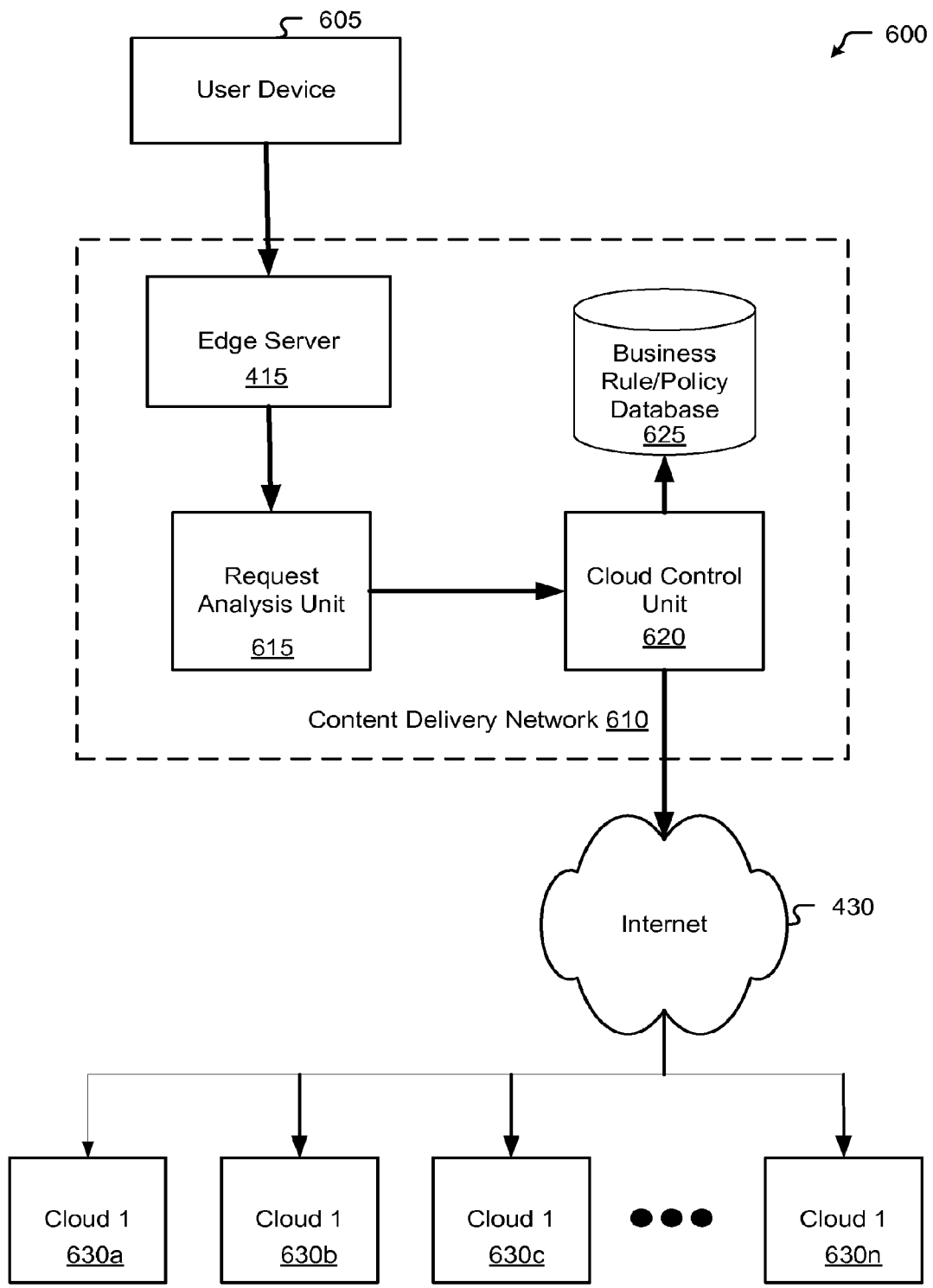
FIGS. 6A and 6B show systems for implementing dynamic route requests for multiple clouds.
Figure 6B:
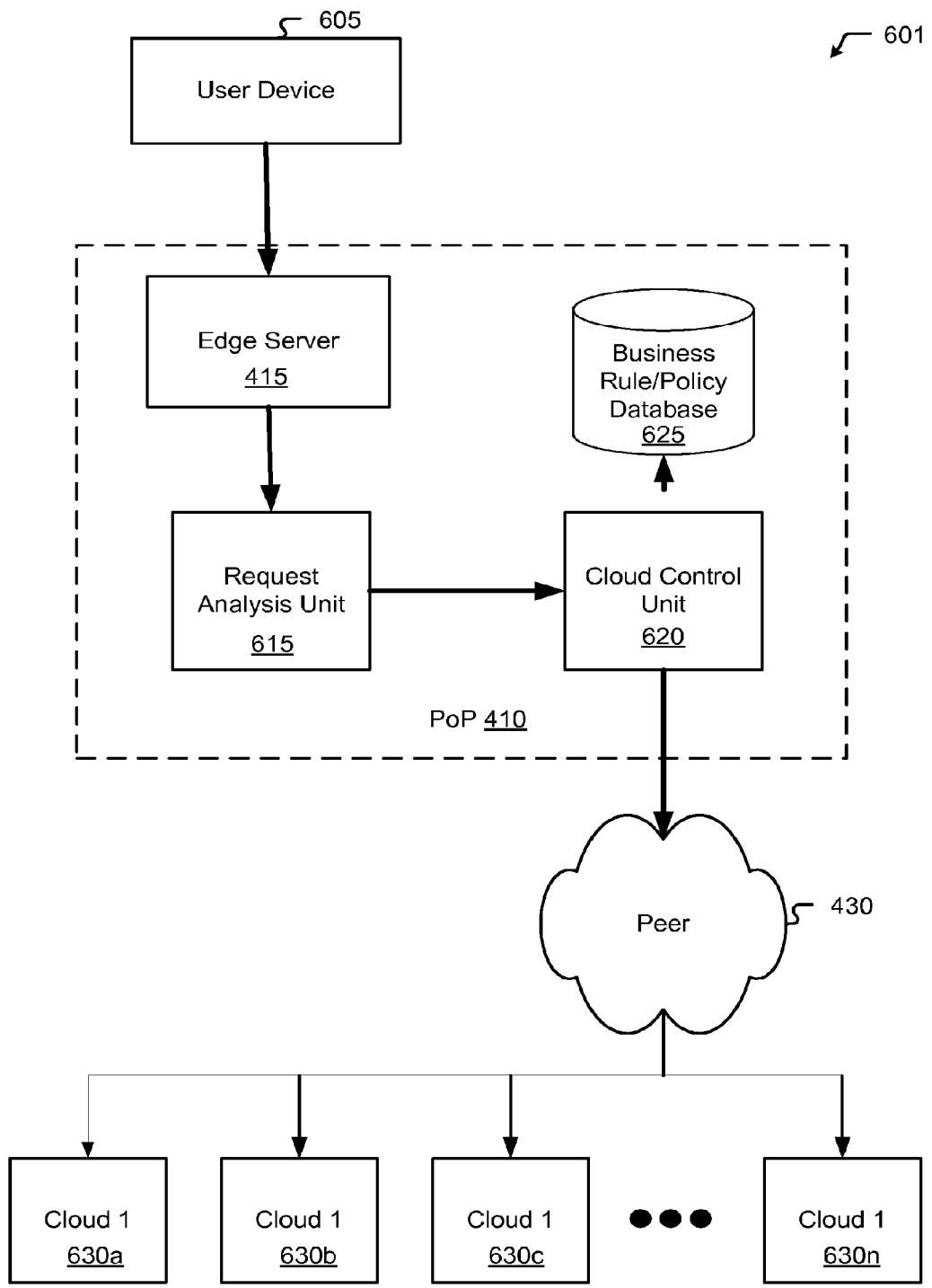

Turning now to FIGS. 6A and 6B, systems 600 and 601 are illustrated in accordance with embodiments of the present invention. System 600 may include a user device (or system) 605 in communication with a CDN 610 or PoP 410. The user device 605 is configured to direct cloud-based application requests to the edge server 415 within the CDN 610 or PoP 410. The edge server 415 may then direct the requests to a request analysis unit 615. In one embodiment, the request analysis unit 615 may be configured to determine the application or service associated with the request, the customer associated with the request, etc.

Accordingly, such information about the request may be passed to a cloud control unit 620. The cloud control unit 620 may access a business rule/policy database 625 to determine the business rules and/or policies associated with the originating customer or destination application associated with the request. As discussed above, the customer preferences may be used to determine which cloud to route various requests. For example, a request from customer X for application Y may be routed differently for requests for application Z, and so forth. Furthermore, the cloud control unit 620 may also access network performance conditions for each of the cloud computing networks 630a-630n. Thus, the cloud control unit 620 may utilize any combination of the request characteristics, the link performance conditions, customer preferences, business rules, policies, etc. to determine which of cloud computing networks 630a-630n to route each request. Furthermore, as conditions and preferences change, the cloud control unit 620 is able to change its routing determinations, thus providing a dynamic routing of requests to cloud computing networks 630a-630n.

Figure 7:
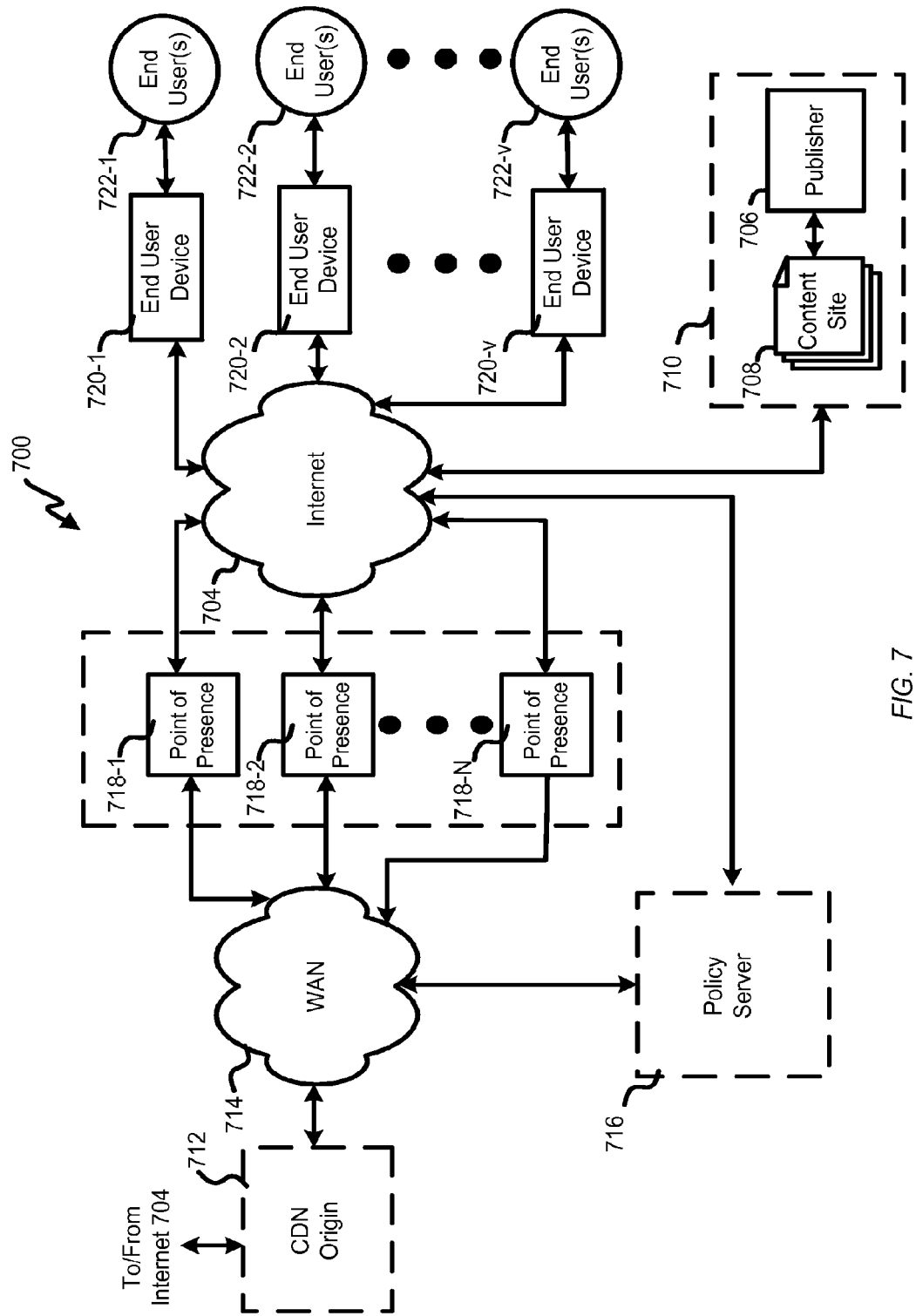
FIG. 7 shows an embodiment of a content distribution system.

Referring first to FIG. 7, a block diagram of an embodiment of a content distribution system 700 is shown in which a content originator 710 offloads delivery of content objects to a content delivery network (CDN). The content originator 710 produces and/or distributes the content objects and may include one or more publishers 706 and content sites 708. The CDN delivers the content objects over the Internet 704 to end users 722 via corresponding end user devices 720.

As shown, the CDN may include an origin server 712, a policy server 716, and various points of presence (PoPs) 718. PoPs 718 can be deployed throughout content distribution system 700 and may serve content objects to end user devices 720 in a particular geographic area and/or in connection with a particular service provider. For example, a PoP 718 may be designated to serve content objects over Internet 704 to end users 722 in a particular city, on a particular access network, etc. to promote efficient delivery and a good user experience. The various CDN elements may be connected by a private network such as WAN 714 and/or a public network such as Internet 704.

An end user 722 may browse for content objects at a content site 708 with its respective end user device 720. As used herein, a content object can be any computer-accessible content and may include audio data, video data, images, etc. in any number of computer-accessible formats. The terms content and content object may be used interchangeably wherever they appear. End user devices 720 can include personal computers, media players, handheld computers, Internet appliances, smart phones, personal digital assistants, streaming radios, or any other device that receives and processes content objects. The content site 708 could be a web page from which content is accessible via a web browser.

Links to content at the content site 708 may point to locations in the content delivery network. When an end user requests delivery of a particular content object, the request may be assigned to a PoP 718 which, in turn, can deliver the requested content object to the end user device 720. If the content object is not available at the assigned PoP location, the request may be propagated toward the core of the CDN and may ultimately be fulfilled from origin server 712. Content may be cached at various points between the core CDN and edge locations to improve efficiency.

Distribution of content objects often represents an important source of revenue for publishers 706. For example, content sites 708 may generate advertising revenue based on the number of times that a content object is viewed, clicked, or downloaded by end users 722. Thus, to maximize their revenue, publishers 706 may seek to reach as many end users 722 with their content as possible while providing a good overall user experience.

Unfortunately, end user devices 720 can vary widely in their respective capabilities and the manner in which they interact with content objects. Different end user devices 720 may support different collections of multimedia formats and different delivery schemes. For example, beginning with OS version 3.0, the iPhone™ from Apple, Inc. supports M3U8 playlists and MPEG-2 segmented video with iPhone™ HTTP Streaming (IHS) delivery, entirely over HTTP (Hypertext Transfer Protocol). On the other hand, the Blackberry Storm™ from Research in Motion, Ltd. supports playback of multimedia content in Third Generation Partnership Project (3GPP) format, over RTSP (Real-Time Streaming Protocol).

To further complicate matters, the manner in which delivery of a content object is initiated may vary from device to device. For example, some end user devices 720 may need help orchestrating a browser-to-player (B2P) handoff for certain types of content objects. Moreover, even when media formats and delivery methods are equally supported, the manner in which a content object is delivered may depend on the type of connection to Internet 704 available to the end user device 720 at a particular place and time. Thus, for example, the playback capabilities of the Blackberry Storm™ may differ depending upon whether it is connected to the Internet 704 via a WIFI connection in a cybercafé, or via a cellular network in a remote location.

In the present embodiment, policy server 716 is coupled to content site 708 via Internet 704 and receives a notification when new content objects are available from publishers 706. Alternatively, a publisher 706 may upload its content to an origin server 712 and policy server 716 may receive notifications via WAN 714 when a new content object becomes available. Although shown separately, policy server 716 may be located within PoPs 718, origin server 712, or other parts of the content delivery network. Also, it will be recognized that the various operations of policy server 716 may be carried out by multiple individual servers such as decisioning servers, merge servers, assembly servers, etc.

When a new content object is ready for processing, policy server 716 determines how it should be made available to end users. This may involve generating a number of different versions of the content object optimized for use with different end user devices 720, having different capabilities, and potentially used in different network environments. The different versions of the content object may correspond to different production or encoding profiles maintained at policy server 716. The production profiles, in turn, may be based upon a publisher's requirements for the distribution of its content objects. For example, a publisher may prefer to distribute its content in a specific media format or formats, to exploit device-specific capabilities (such as IHS streaming for iPhones), to optimize separately for high bitrate and low bitrate environments, to target specific operating systems and/or platforms such as Windows™ or Mac OS, etc.

Policy server 716 may associate the different versions of a content object with a single network identifier such as a uniform resource locator (URL). The single network identifier can then be returned to the publisher 706 which created the content. The publisher 706 can add the network identifier to one or more content sites 708 which are accessible to end users 722. When a request for the content object is received from an end user device 720, it can be sent to policy server 716 for analysis. Using all available information, policy server 716 can determine a preferred version of the content object for the end user device 720 and can orchestrate its delivery to the requesting end user. The preferred version and delivery method can be customized for hardware and software capabilities of the end user device 720, bandwidth and connection quality, viewing habits, user preferences, or any combination of factors. The preferred version may also include a selection of advertisements which are matched to information about the end user device and/or the end user.

As described herein, policy server 716 provides publishers 706 with a one-to-many approach to optimized content delivery. Specifically, a single network identifier can point to multiple versions of a given content object from which policy server 716 selects a preferred version for use with a particular end user device. Policy server 716 thus relieves publishers 706 of the burden of staying up-to-date with technology. When a new platform emerges or device capabilities change, appropriate versions of the content object can be made available to end users 722 through an existing network identifier without further effort from the publisher 706. Policy server 716 determines the preferred version of a content object in a manner that is transparent to the end user and thus avoids complicated configuration, specialized software, or manual selection. The end user experience is further improved by selecting a delivery method and sending the preferred version of the content object from a PoP 718 location with a fast response time for the user's location, network access, etc.

Figure 8:
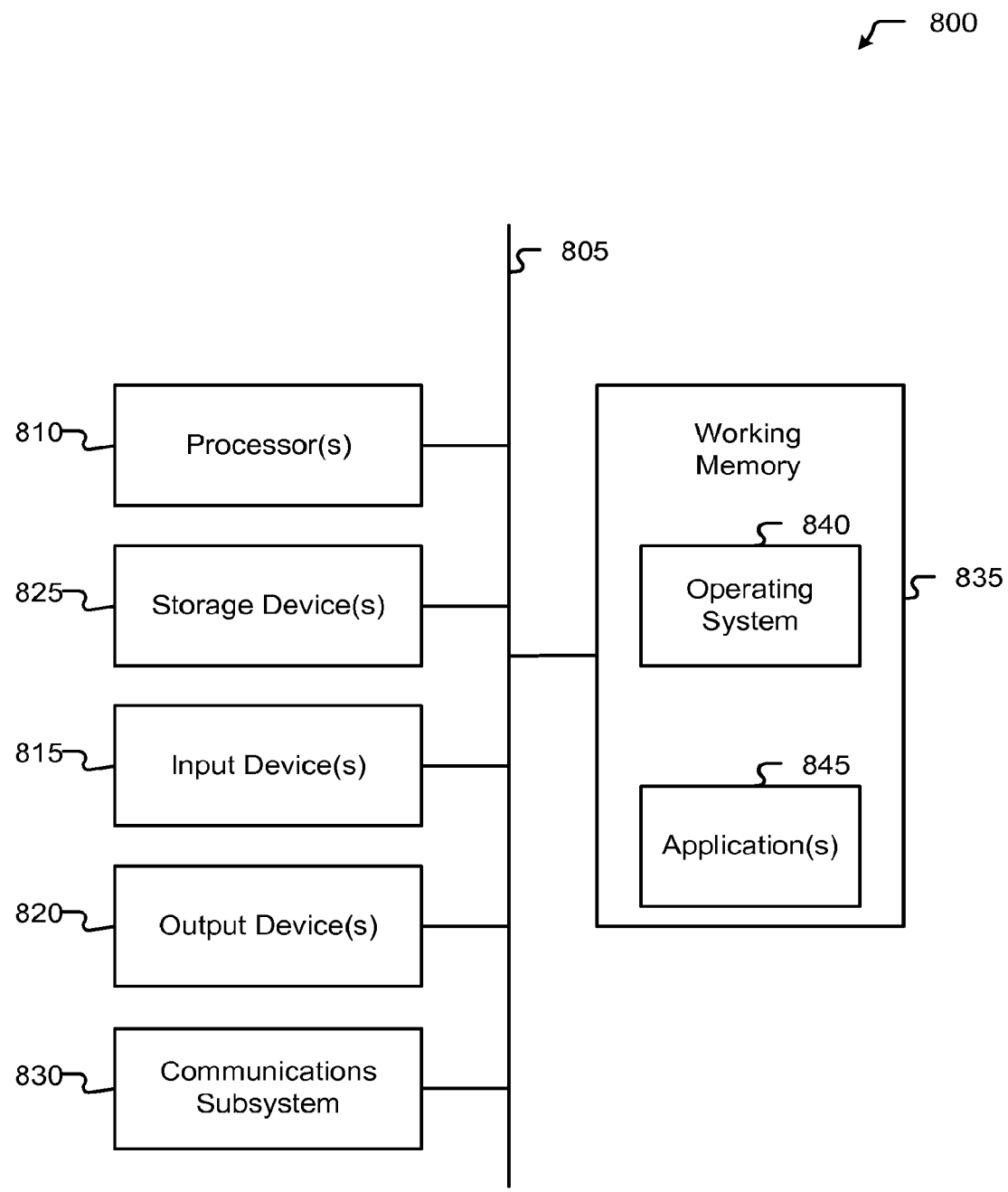
FIG. 8 shows an embodiment of a computer system.

FIG. 8 provides a schematic illustration of one embodiment of a computer system 800 that can perform the methods of the invention, as described herein. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements can include one or more processors 810, including without limitation, one or more general purpose processors and/or one or more special purpose processors (such as digital signal processing chips, graphics acceleration chips, and/or the like); one or more input devices 815, which can include without limitation a mouse, a keyboard and/or the like; and one or more output devices 820, which can include without limitation a display device, a printer and/or the like.

The computer system 800 may further include (and/or be in communication with) one or more storage devices 825, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840 and/or other code, such as one or more application programs 845, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code. In one embodiment, the computer or machine-readable medium may be non-transitory.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 800) to perform methods of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another machine-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 800, various machine-readable media might be involved in providing instructions/code to processor (s) 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 825. Volatile media includes, without limitation, dynamic memory, such as the working memory 835. Transmission media includes coaxial cables, copper wire and fiber optics, including the wires that comprise the bus 805, as well as the various components of the communications subsystem 830 (and/or the media by which the communications subsystem 830 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc., carried by the signals) to the working memory 835, from which the processor(s) 810 retrieves and executes the instructions. The instructions received by the working memory 835 may optionally be stored on a storage device 825 either before or after execution by the processor(s) 810.

As will be understood by those skilled in the art, the present invention may be embodied in other specific forms. In one particular embodiment of the partial object cache, as previously described, can be associated with a plurality of versions of programming structures. Those skilled in the art will recognize, or be able to ascertain using no more than routine experimentation, many equivalents to the specific embodiments of the invention described herein. Such equivalents are intended to be encompassed by the following claims.

What is claimed is:

1. A method of implementing edge-based cloud computing including an edge server that communicates with end users and arranges application resources, the method comprising:
   determining an edge server from a plurality of geographically distributed edge servers within a cloud to use to communicate with a user device based on an efficiency threshold, wherein a content delivery network comprises the plurality of geographically distributed edge servers;
   receiving, at the determined edge server, an application service request from a user device;
   analyzing the application service request to gather metrics about historical responses provided by applications in each of a plurality of clouds;
   based on the gathered metrics, determining a cloud of the plurality of clouds to which to direct the application service request;
   forwarding the application service request to a compute platform in the determined cloud;
   capturing a response to the application service request from the determined cloud; and
   responding to the application service request.

2. The method of implementing edge-based cloud including the edge server that communicates with end users and arranges application resources computing of claim 1, wherein the cloud is also determined based on a business rule.

3. The method of implementing edge-based cloud including the edge server that communicates with end users and arranges application resources computing of claim 1, wherein the historical responses include responses to past application service requests from user devices.

4. The method of implementing edge-based cloud computing including the edge server that communicates with end users and arranges application resources of claim 1, wherein the historical responses include historical responses to pings.

5. The method of implementing edge-based cloud computing including the edge server that communicates with end users and arranges application resources of claim 1, further comprising updating or generating a cloud routing table based on the gathered metrics, wherein the cloud is determined in accordance with routing in the cloud routing table.

6. The method of implementing edge-based cloud computing including the edge server that communicates with end users and arranges application resources of claim 5, wherein the routing in the cloud routing table further depends on preferences of a customer.

7. The method of implementing edge-based cloud computing including the edge server that communicates with end users and arranges application resources of claim 1, wherein the efficiency threshold comprises a latency value between the user device and the edge server.

8. A computer-readable memory having sets of instructions stored thereon which, when executed by a computer, cause the computer to:
   determine an edge server from a plurality of geographically distributed edge servers within a cloud to use to communicate with a user device based on an efficiency threshold, wherein a content delivery network comprises the plurality of geographically distributed edge servers;
   receive, at the determined edge server, an application service request from a user device;

analyze the application service request to gather metrics about historical responses provided by applications in each of a plurality of clouds;

based on the gathered metrics, determine a cloud of the plurality of clouds to which to direct the application service request;

forward the application service request to a compute platform in the determined cloud;

capture a response to the application service request from the determined cloud; and respond to the application service request.

9. The computer-readable memory of claim 8, wherein the cloud is also determined based on a business rule.

10. The computer-readable memory of claim 8, wherein the historical responses include responses to past application service requests from user devices.

11. The computer-readable memory of claim 8, wherein the historical responses include historical responses to pings.

12. The computer-readable memory of claim 8, wherein the instructions, when executed by the computer, further cause the computer to update or generate a cloud routing table based on the gathered metrics, wherein the cloud is determined in accordance with routing in the cloud routing table.

13. The computer-readable memory of claim 12, wherein the routing in the cloud routing table further depends on preferences of a customer.

14. The computer-readable memory of claim 8, wherein the efficiency threshold comprises a latency value between the user device and the edge server.

15. A system for implementing edge-based cloud computing including an edge server that communicates with end users and arranges application resources, the system comprising:

an edge server configured to receive an application service request from a user device, the edge server being of a plurality of geographically distributed edge servers within a cloud, a content delivery network comprising the plurality of geographically distributed edge servers, the edge server being selected from amongst the plurality of edge servers based on an efficiency threshold;

a cloud control unit configured to:
analyze an application service request received at the edge server from a user device to gather metrics about historical responses provided by applications in each of a plurality of clouds;

based on the gathered metrics, determine a cloud of the plurality of clouds to which to direct the application service request;

forward the application service request to a compute platform in the determined cloud; and capture a response to the application service request from the determined cloud.

16. The system for implementing edge-based cloud computing including the edge server that communicates with end users and arranges application resources as in claim 15, wherein the edge server and the cloud control unit are within a single point of presence (PoP) in the content delivery network, the content delivery network comprising a plurality of points of presence.

17. The system for implementing edge-based cloud computing including the edge server that communicates with end users and arranges application resources as in claim 15, further comprising a request analysis unit that determines an application or service associated with the request, wherein the cloud control unit accesses a policy associated with the application or service, and wherein the cloud is determined at least in part based on the policy.

18. The system for implementing edge-based cloud computing including the edge server that communicates with end users and arranges application resources as in claim 15, further comprising a request analysis unit that determines a customer associated with the request, wherein the cloud control unit accesses a policy associated with customer, and wherein the cloud is determined at least in part based on the policy.

19. The system for implementing edge-based cloud computing including the edge server that communicates with end users and arranges application resources as in claim 15, wherein the historical responses include responses to past application service requests from user devices.

20. The system for implementing edge-based cloud computing including the edge server that communicates with end users and arranges application resources as in claim 15, wherein the historical responses include historical responses to pings.

* * * * *

UNITED STATES PATENT AND TRADEMARK OFFICE
CERTIFICATE OF CORRECTION

PATENT NO.         : 8,539,079 B2
APPLICATION NO.    : 13/572505
DATED              : September 17, 2013
INVENTOR(S)        : Jason Thibeault Page 1 of 1

It is certified that error appears in the above-identified patent and that said Letters Patent is hereby corrected as shown below:

On the Title Page, Item (12) please delete "Thireault" and insert -- Thibeault --.

On the Title Page, Item (75) please delete "Jason Thireault" and insert -- Jason Thibeault --.

Signed and Sealed this
Twenty-second Day of April, 2014

Michelle K. Lee
*Deputy Director of the United States Patent and Trademark Office*